106. COMPOSITIONS, COATING OR PLASTIC.

Patented Feb. 17, 1931

1,792,661

UNITED STATES PATENT OFFICE

FOSTER DEE SNELL, OF BROOKLYN, NEW YORK

PLASTER AND METHOD OF MAKING THE SAME

No Drawing.    Application filed March 30, 1929.    Serial No. 351,461.

This invention relates to plasters and processes of making the same, and it comprises a plaster containing as usual a calcareous binder and an aggregate and also containing an intimately incorporated lime soap in minor amount, such amount being about, but not substantially greater than, that which can be absorbed by the pore-forming surfaces of the solids in the plaster, this amount usually being of the order of 0.002 to 0.01 per cent of the whole composition and being sufficient to reduce suction or speed of adsorption of water without substantial interference with the porosity; and it further comprises a method of reducing the suction of plaster compositions without disturbing their porosity which comprises intermingling a soap with the plaster composition at the time of gaging, the soap being used in the amount which will produce sufficient lime soap to give an adsorbed coating thereof on the pore-forming solid surfaces in the plaster without substantial plugging of pores, this amount being usually of the order of 0.002 to 0.01 per cent of the whole composition; all as more fully hereinafter set forth and as claimed.

Wall plaster is composed of a calcareous binder, an aggregate (sand) and water; the amount of water being sufficient to give a troweling consistency and to give a highly porous composition after the composition is dry. Porosity in plaster is desirable. The calcareous binder may be lime, cement, aluminate cement or plaster of Paris. Plaster is usually applied in two or three stages: First, a scratch coat may be applied; second, a brown coat; and finally, a finishing white coat. A typical brown coat composition in the wet state carries about 200 pounds of lime (and magnesia), 2500 pounds of sand and 500 pounds of water, per cubic yard; a total of 3200 pounds. It may carry a pound or so of hair. Scratch coat compositions usually carry more hair, say 5 to 8 pounds.

After the brown coat is applied it is given time to set up and dry out and then the final or finishing coat is applied. These operations require considerable skill. As stated, the dry plaster should be quite porous and set in the allotted time; and it is considered undesirable in the best practice to load the plaster with anything that will plug the pores. Much of the necessity for skill is because of the tendency of the "suction" of the partly dry set brown coat to abstract water from the white coat.

It is an object of the present invention to reduce the suction of dried or partially dried set plaster to a point where it does not interfere with the application of the finish coat; i. e. to a point where absorption of water is not inconveniently rapid; and to do this without plugging the pores, distributing the set or in any way interfering with the ordinary properties or manipulation of plaster.

Setting and drying of the plaster in place go on simultaneously, but drying is a variable factor depending on temperature and weather. The suction depends on the dryness, but is a quite irregular phenomenon. It is the irregularity in drying and in suction that necessitates special skill on the part of the plasterer.

In a general way, adsorption of water by the walls of a pore must precede absorption of water by the pore; a principle which is utilized in shower proofing garments. In partly dry plaster, adsorbed water films on the pore walls are still in place and absorption is rapid. Both the sand and the lime, but particularly the lime, have hygroscopic surfaces and retain this water film with considerable tenacity.

I have found that by producing a minute amount of colloidally dispersed lime soap in the plaster, by an addition of soap, the lime soap is adsorbed on the surfaces of the solids and when the plaster sets to a porous layer, water no longer tends to enter rapidly. The lime soaps are quite non-hygroscopic and their presence on the pore walls reduces, or practically nullifies, the initial adsorption of water which is precedent to absorption. To secure the result that I want, namely reduction of suction without interference with porosity or any of the normal properties of the plaster, the amount of soap I use must be quite small; ordinarily not over 0.16 pounds per cubic yard of wet plaster. It is an interesting calculation that the amount of lime soap which is produced corresponds pretty nearly to a monomolecular film of soap covering the available solid surfaces in the plaster with the amount of surface ordinarily present; that is, with materials in the ordinary state of subdivision. Perhaps there is a little less soap than corresponds to the entire surface available. About 0.35 pounds of soap such as soda soap per cubic yard is perhaps the maximum for my purposes.

The particular nature of the lime soap which is present is not as important as its quantity. Suitable lime soaps for my purposes may be made by incorporating directly into the wet plaster mix any ordinary soap containing fatty acids or resin acids in combination with soda, potash, or ammonia. The soaps react with the lime to form lime soaps. The same reaction occurs when the soap is mixed with wet lime, cement and plaster of Paris.

As stated, the amount of lime soap present is apparently about that which will be adsorbed by the solids with the production of a monomolecular film and it is not enough to produce any substantial plugging of pores. Uniform distribution of the lime soap throughout the mass, in spite of its small amount, offers no great difficulty. Ordinary mixing suffices.

By the means described a wet plaster can be produced which trowels, dries and otherwise behaves like ordinary plaster. No difference is observed by the workman in applying it to the wall. On the wall, it dries and sets in the ordinary fashion and the one difference is reduction of suction. Water on a pat of the dried treated plaster is not taken up swiftly as it is by a similar pat of similar age of untreated plaster.

Suction is not entirely eliminated, nor is it desirable that it should be. The first plaster must take up enough of the next to permit keying and bonding. By the use of about 0.16 pound of soap per cubic yard, the most advantageous results are obtained. With substantial increase in the amount, the material becomes, in general, disadvantageously waterproof. For example, with an amount as great as 0.35 pound of soap per cubic yard, the set plaster is almost too waterproof. Such a proportion, however, is sometimes advantageous, as when it is desirable to finish the rough coat with varnishes or oily compositions in lieu of using a white coat of calcareous material. While lime soaps do not adsorb water readily, they do adsorb oily materials; and with lime soap present in the set paster, oily varnishes, lacquers and the like can be made to key to the set plaster prior to its complete drying.

In a specific embodiment of the present invention, providing a ready mixed lime plaster of retarded suction, 200 pounds of lime are slaked with about 470 pounds of water, the amount of water varying somewhat with the nature of the lime. After the mixture is aged for a time there is admixed about a cubic yard of sand, say 2500 pounds. At the time of mixing the sand with the lime putty there is added a small amount of commercial soda soap, say 0.16 pound. This soap is thoroughly incorporated with the mixture during the mixing of the putty and the sand. The result is a cubic yard of plaster ready for application to the wall. The desired amount of hair may be admixed with the composition.

In making plasters with cement or plaster of Paris, the procedure is similar and in general the proportions may be the same.

What I claim is—

1. As a new material, a plaster of retarded suction, said plaster being composed of a calcareous binder, a filler and water with a minimal amount of included dispersed lime soap, said soap being present in amounts not greater than 0.35 pound per cubic yard.

2. As a new material, a plaster of retarded suction, said plaster being composed of a calcareous binder, a filler and water with a minimal amount of included dispersed lime soap, said soap being present in amount of the order of 0.16 pound per cubic yard.

3. As a new material, a wall plaster of retarded suction, said plaster being composed of lime, filler and water with a minimal amount of dispersed adsorbed lime soap, said soap being present in amounts of the order of about 0.16 pound per cubic yard.

4. The process of retarding the suction of wall plaster which comprises adding to the wet plaster about 0.16 pound soap per cubic yard.

5. As a new material, a porous wall plaster of retarded suction composed of a calcareous binder, a filler and water and containing soap in amounts between 0.002 and 0.01 per cent of the whole mass.

6. As a new material, a calcareous wall plaster adapted to serve as a first or rough coat in plastering, said plaster containing a lime soap in amount insufficient to interfere substantially with the ordinary porosity of such composition and not being waterproof but exhibiting a retarded suction on the application of a second coat.

In testimony whereof I hereto affix my signature.

FOSTER DEE SNELL.